United States Patent
Li et al.

(10) Patent No.: US 9,559,977 B2
(45) Date of Patent: *Jan. 31, 2017

(54) SYSTEM AND METHOD FOR SUPPORTING A DYNAMIC RESOURCE BROKER IN A TRANSACTIONIAL MIDDLEWARE MACHINE ENVIRONMENT

(71) Applicant: Oracle International Corporation, Redwood Shores, CA (US)

(72) Inventors: Jared Zhen Yu Li, Beijing (CN); Lidan Liu, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,741

(22) Filed: Jul. 25, 2014

(65) Prior Publication Data

US 2014/0337533 A1    Nov. 13, 2014

Related U.S. Application Data

(63) Continuation of application No. 13/423,024, filed on Mar. 16, 2012, now Pat. No. 8,825,864.

(Continued)

(51) Int. Cl.
*G06F 15/173* (2006.01)
*H04L 12/911* (2013.01)
(Continued)

(52) U.S. Cl.
CPC .......... *H04L 47/70* (2013.01); *G06F 8/60* (2013.01); *G06F 9/5072* (2013.01); *G06F 2209/508* (2013.01)

(58) Field of Classification Search
None
See application file for complete search history.

(56) References Cited

U.S. PATENT DOCUMENTS 5,995,945 A   11/1999 Notani et al.
6,075,938 A   6/2000 Bugnion et al.
(Continued)

FOREIGN PATENT DOCUMENTS

CN   101256495   9/2008
CN   102135899   7/2011
(Continued)

OTHER PUBLICATIONS

International Search Report and Written Opinion dated Nov. 29, 2012, International Application No. PCT/US2012/057131, 7 pages.

(Continued)

*Primary Examiner* — Farid Homayounmehr
*Assistant Examiner* — Olanrewaju Bucknor
(74) *Attorney, Agent, or Firm* — Tucker Ellis LLP

(57) ABSTRACT

A system and method can support dynamically scaling up/down transactional resources in a transactional middleware machine environment. Transactional resources, such as groups and machines, can be added or removed using a dynamic resource broker according to resource usage changes. The transactional middleware machine environment can comprise a deployment center in the transactional middleware machine environment, wherein the deployment center maintains one or more deployment policies for the transactional middleware machine environment and one or more deployment agents. Each of the one or more deployment agents is associated with a transactional middleware machine of a plurality of transactional middleware machines in a transactional domain in the transactional middleware machine environment. The deployment center operates to (Continued)

receive machine usage information from the one or more deployment agents, and dynamically scale up/down resources used in the transactional domain based on the resource usage information collected by the one or more deployment agents.

20 Claims, 4 Drawing Sheets

Related U.S. Application Data

(60) Provisional application No. 61/541,059, filed on Sep. 29, 2011.

(51) Int. Cl.
*G06F 9/50* (2006.01)
*G06F 9/445* (2006.01)

(56) References Cited

U.S. PATENT DOCUMENTS

| | | | |
|---|---|---|---|
| 6,640,238 B1 | 10/2003 | Bowman-Amuah | |
| 7,376,945 B1 | 5/2008 | Kakumani et al. | |
| 7,458,073 B1 | 11/2008 | Darling et al. | |
| 7,506,335 B1 | 3/2009 | Wooff et al. | |
| 7,530,065 B1 | 5/2009 | Ciudad et al. | |
| 7,657,887 B2 | 2/2010 | Kothandaraman et al. | |
| 7,827,549 B2 | 11/2010 | Tarassov | |
| 7,865,619 B2* | 1/2011 | Saad | G06F 9/541 370/229 |
| 7,870,568 B2* | 1/2011 | Bernardin | G06Q 10/06 709/202 |
| 8,145,760 B2* | 3/2012 | Dinda | G06F 9/4887 709/226 |
| 8,196,133 B2 | 6/2012 | Kakumani et al. | |
| 8,301,742 B2* | 10/2012 | Hanson | H04L 12/10 709/223 |
| 8,443,438 B1* | 5/2013 | Sharir | H04L 67/02 380/258 |
| 8,484,638 B2 | 7/2013 | Tal et al. | |
| 8,527,545 B2 | 9/2013 | Bobick et al. | |
| 8,572,612 B2* | 10/2013 | Kern | G06F 9/5072 717/177 |
| 8,615,761 B2 | 12/2013 | Machida | |
| 8,832,239 B2* | 9/2014 | Assuncao | G06F 9/45558 705/51 |
| 8,856,337 B2* | 10/2014 | Otani | G06F 15/173 709/226 |
| 8,863,114 B2 | 10/2014 | Shah | |
| 8,874,742 B2* | 10/2014 | Johnsen | H04L 12/1863 709/225 |
| 2003/0050932 A1* | 3/2003 | Pace | G06F 8/60 |
| 2003/0131084 A1 | 7/2003 | Pizzorni et al. | |
| 2003/0167270 A1 | 9/2003 | Werme et al. | |
| 2003/0172135 A1 | 9/2003 | Bobick | |
| 2005/0060349 A1 | 3/2005 | Shirin | |
| 2006/0026599 A1 | 2/2006 | Herington | |
| 2006/0036721 A1* | 2/2006 | Zhao | H04L 67/125 709/223 |
| 2006/0149840 A1* | 7/2006 | Thompson | H04L 12/5695 709/224 |
| 2007/0043860 A1* | 2/2007 | Pabari | G06F 9/5072 709/224 |
| 2007/0180453 A1 | 8/2007 | Burr et al. | |
| 2008/0082689 A1 | 4/2008 | Saad | |
| 2008/0256531 A1* | 10/2008 | Gao | G06F 8/61 717/177 |
| 2008/0275935 A1* | 11/2008 | Mohindra | H04L 67/16 709/201 |
| 2009/0276519 A1 | 11/2009 | Alimi et al. | |
| 2009/0313319 A1* | 12/2009 | Beisiegel | G06F 9/445 709/203 |
| 2010/0125855 A1 | 5/2010 | Ferwerda et al. | |
| 2011/0137953 A1* | 6/2011 | Bobick | G06F 8/60 707/799 |
| 2011/0153727 A1* | 6/2011 | Li | G06F 9/5055 709/203 |
| 2011/0179132 A1 | 7/2011 | Mayo et al. | |
| 2011/0179134 A1 | 7/2011 | Mayo et al. | |
| 2011/0213884 A1 | 9/2011 | Ferris et al. | |
| 2011/0213885 A1 | 9/2011 | Kelkar et al. | |
| 2011/0231837 A1 | 9/2011 | Sheehan et al. | |
| 2012/0036249 A1* | 2/2012 | Chandrasekaran | G06F 9/5088 709/224 |
| 2012/0096453 A1 | 4/2012 | Meilstrup et al. | |
| 2012/0137282 A1 | 5/2012 | Illowsky et al. | |
| 2012/0167073 A1 | 6/2012 | Stevens | |
| 2012/0185441 A1* | 7/2012 | Sankar | G06F 11/3495 707/687 |

FOREIGN PATENT DOCUMENTS

| | | |
|---|---|---|
| JP | 2002325111 | 11/2002 |
| JP | 2011034403 | 2/2011 |
| WO | 2010100867 | 9/2010 |

OTHER PUBLICATIONS

International Search Report and Written Opinion dated Nov. 29, 2012, International Application No. PCT/US2012/057136, 8 pages.
U.S. Patent and Trademark Office, International Searching Authority, International Search Report and Written Opinion dated Nov. 29, 2012, International Application No. PCT/US2012/057131, 7 pages.
U.S. Patent and Trademark Office, International Searching Authority, International Search Report and Written Opinion dated Nov. 29, 2012, International Application No. PCT/US2012/0057136, 8 pages.
Rayns et al., "TXSeries for Multiplatforms Version 6 Revealed! The Next Generation of Distributed CICS", © Copyright IBM Corp. 2006, pp. 1-42.
Cala et al., "Automatic Software Deployment in the Azure Cloud", © IFIP International Federation for Informationa Processing 2010, pp. 155-168.
Michael Isard, "Autopilot: Automatic Data Center Management", 2007, Microsoft Research Silicon Valley, Operating Systems Review vol. 41:2, pp. 60-67.
Kecskemeti et al., "Automatic Service Deployment Using Virtualisation" © IEEE 2008, 16$^{th}$ Euromicro Conference on Parallel, Distributed and Network-Based Processing, pp. 628-635.
European Patent Office, International Searching Authority, Extended European Search Report dated Jul. 23, 2015 for International Application No. PCT/US2012/057131, 6 pages.
Search Report from State Intellectual Property Office of the People's Republic of China dated Sep. 15, 2015 for Chinese Patent Application No. 201280047481.0.
State Intellectual Property Office of the People's Republic of China, Office Action Dated April 20, 2016 for Chinese Patent Application No. 201280047484.4, 54 Pages.

* cited by examiner

SYSTEM AND METHOD FOR SUPPORTING A DYNAMIC RESOURCE BROKER IN A TRANSACTIONAL MIDDLEWARE MACHINE ENVIRONMENT

CLAIM OF PRIORITY

This application is a continuation of U.S. patent application Ser. No. 13/423,024, filed Apr. 4, 2013 entitled "SYSTEM AND METHOD FOR SUPPORTING A DYNAMIC RESOURCE BROKER IN A TRANSACTIONAL MIDDLEWARE MACHINE ENVIRONMENT" which claims the benefit of priority on U.S. Provisional Patent Application No. 61/541,059, entitled "SYSTEM AND METHOD FOR SUPPORTING A DYNAMIC RESOURCE BROKER IN A TRANSACTIONAL MIDDLEWARE MACHINE ENVIRONMENT" filed Sep. 29, 2011, which applications are herein incorporated by reference.

CROSS-REFERENCED APPLICATIONS

The current application hereby incorporates by reference the material in the following patent applications:

U.S. patent application Ser. No. 13/423,035, filed Mar. 16, 2012, now U.S. Pat. No. 9,003,397, issued Apr. 7, 2015 entitled "SYSTEM AND METHOD FOR SUPPORTING AUTOMATICALLY DEPLOYING/UNDEPLOYING APPLICATION COMPONENTS IN A TRANSACTIONAL MIDDLEWARE MACHINE ENVIRONMENT".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a transactional middleware machine environment.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Described herein is a system and method for supporting dynamically scaling up/down transactional resources in a transactional middleware machine environment. Transactional resources, such as groups and machines, can be added or removed using a dynamic resource broker according to resource usage changes. The transactional middleware machine environment can comprise a deployment center in the transactional middleware machine environment, wherein the deployment center maintains one or more deployment policies for the transactional middleware machine environment and one or more deployment agents. Each of the one or more deployment agents is associated with a transactional middleware machine of a plurality of transactional middleware machines in a transactional domain in the transactional middleware machine environment. The deployment center operates to receive machine usage information from the one or more deployment agents, and dynamically scale up/down resources used in the transactional domain based on the resource usage information collected by the one or more deployment agents.

DETAILED DESCRIPTION

Figure 1:
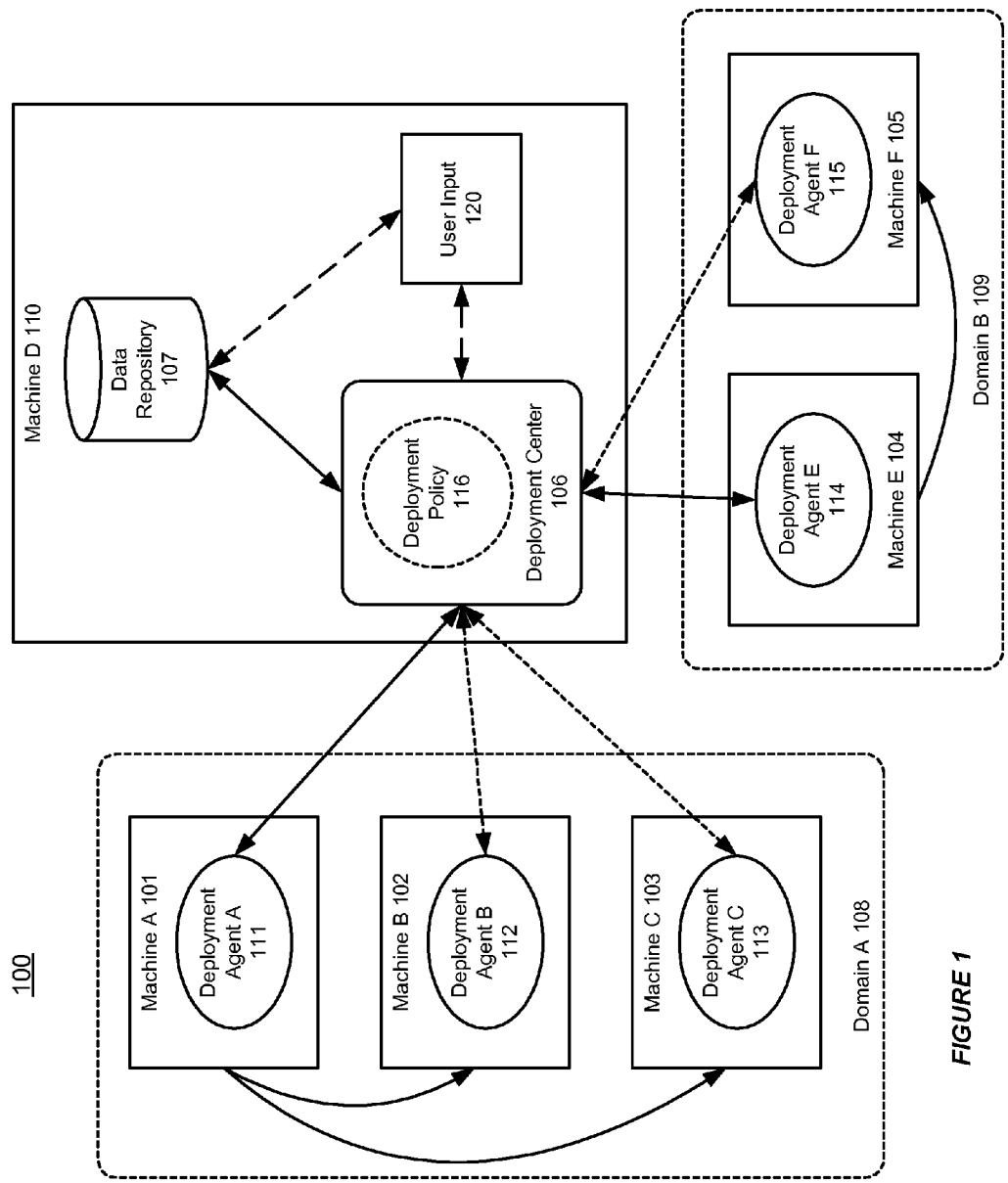
FIG. 1 shows an illustration of a transactional middleware machine environment that supports dynamically scaling up/down a transactional system in a transactional middleware machine environment, in accordance with an embodiment of the invention.

Described herein is a system and method for supporting a transactional middleware system that can take advantage of fast machines with multiple processors, and a high performance network connection. A dynamic resource broker can dynamically scale up/down a transactional system in the transactional middleware machine environment by adding/removing groups and machines according to the resource usage changes. The transactional middleware machine environment can comprise a deployment center in the transactional middleware machine environment, wherein the deployment center maintains one or more deployment policies for the transactional middleware machine environment, and one or more deployment agents, each of which is associate with a transactional middleware machine of a plurality of transactional middleware machines in a transactional domain in the transactional middleware machine environment. The deployment center operates to receive machine usage information from the one or more deployment agents, and dynamically scale up/down resource used in the transactional domain based on the resource usage information collected by the one or more deployment agents.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateways, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, a transactional system, e.g. Tuxedo, can be a set of software modules that enables the construction, execution, and administration of high performance, distributed business applications and has been used as transactional middleware by a number of multi-tier application development tools. The transactional system is a platform that can be used to manage distributed transaction processing in distributed computing environments. It is a platform for unlocking enterprise legacy applications and extending them to a services oriented architecture, while delivering unlimited scalability and standards-based interoperability.

A dynamic resource broker can dynamically scale up/down the transactional system, e.g. a Tuxedo, in the transactional middleware machine environment by adding/removing groups and machines according to the resource usage changes. Thus, the transactional system can take advantage of fast machines with multiple processors, e.g. Exalogic middleware machines, and a high performance network connection, e.g. an Infiniband (IB) network.

Scaling Up and Down a Transactional System

In accordance with an embodiment of the invention, a dynamic resource broker can be supported in a transactional middleware machine environment to dynamically scale up/down a transactional system according to the resource usage changes. The dynamic resource allocation/de-allocation of a transactional system can help the users to manage the resources in a flexible cloud environment. The system can collect resource usage metrics, and the users are allowed to define rules to scale up/down transactional resources based on resource usage changes. Then, the transactional system can be dynamically scaled up and down according to the user-defined rules based on the resource usage changes.

FIG. 1 shows an illustration of a transactional middleware machine environment that supports dynamically scaling up/down a transactional system in a transactional middleware machine environment, in accordance with an embodiment of the invention. As shown in FIG. 1, the transactional middleware machine environment 100 includes a plurality of transactional middleware machines, such as Machines A-D 101-103 and 110.

A dynamic resource broker in a transactional middleware machine environment can include several components, such as a data repository 107 on Machine D 110, a deployment center 106 on Machine D 110, and one or more deployment agents: Deployment Agents A-C 111-113. Each deployment agent resides on a transactional middleware machine, Machines A-C 101-103, in the transactional middleware machine environment.

A deployment center 106 can receive all the user inputs 120 and is responsible for distributing the instructions/packages to the destination machines, Machines A-C 101-103, and receiving the execution result from the destination machines. Additionally, the deployment center 106 can maintain one or more deployment policies 116 for the transactional middleware machine environment based on user input 120.

Each deployment agent, Deployment Agents A-C 111-113, is responsible for receiving the distribution packages from the deployment center 106, and executing the deployment/un-deployment/management tasks on a particular machine that it resides on. Furthermore, each deployment agent, Deployment Agents A-C 111-113, can collect resource usage metrics of a particular machine that the deployment agent resides on and report such resource usage metrics back to the deployment center 106. Then, at runtime, the deployment center 106 can make decisions on how to add or remove groups and machines according to the resource usage changes. Finally, the deployment agent, Deployment Agents A-C 111-113, can provide the execution result back to the deployment center 106.

As shown in FIG. 1, the transactional middleware machine environment 100 can include one or more transactional domains, such as Domains A-B 108-109. In addition to Machines A-C 101-103 in Domain A 108, the deployment center 106 on Machine D 110 can receive machine usage information for Machines E-F 104-105 in Domain B 109 via Deployment Agents E-F 104-105. The deployment center 106 can manage the resource usage separately for each transactional domain, Domain A-B 108-109. The deployment center 106 operates to dynamically scale up and/or down work load in each transactional domain, Domain A-B 108-109, based on the resource usage information collected by the deployment agents, Deployment Agents A-C 111-113 in Domain A 108 and Deployment Agents E-F 114-115 in Domain B 109.

Within each transactional domain, Domains A-B 108-109, there can be a master machine that can always be available for providing transactional services. In the example as shown in FIG. 1, Machine A 101 can be the master machine in Domain A 108. Therefore, the configuration of Machine A 101 may not be changed, while the deployment center 106 can dynamically decide whether Machine B 102 and Machine C 103 should be activated and be deployed with necessary components at run time.

The data repository 107 can be used to store the application deployment related information, such as application packages, distribution packages and configuration files. Users can upload all necessary components for an application into the data repository 107, before the application is deployed to various transactional application server machines. The deployment center 106 can obtain the required components for a deployment from the data repository 107 and deploy the particular components to a particular machine in order to meet the service needs.

Figure 2:
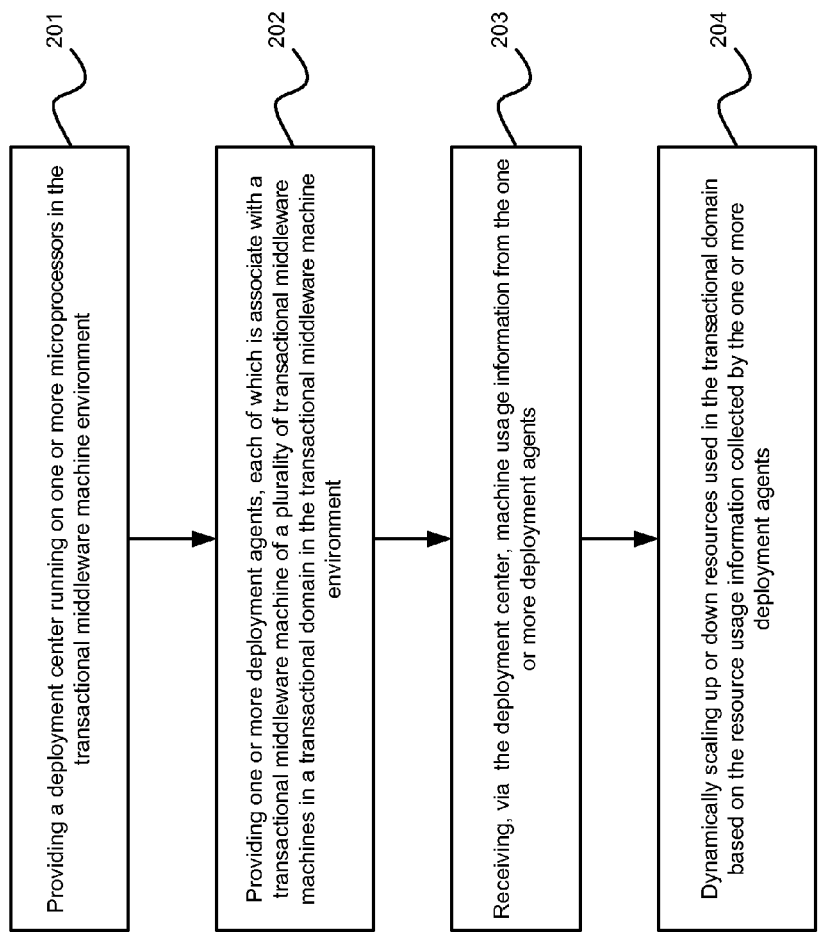
FIG. 2 illustrates an exemplary flow chart for supporting dynamically scaling up/down a transactional system in a transactional middleware machine environment, in accordance with an embodiment of the invention.

FIG. 2 illustrates an exemplary flow chart for supporting dynamically scaling up/down a transactional system in a transactional middleware machine environment, in accordance with an embodiment of the invention. As shown in FIG. 2, at step 201, a deployment center is provided in the transactional middleware machine environment. At step 202, one or more deployment agents are provided in the transactional middleware machine environment. Each deployment agent is associated with a transactional middleware machine in a transactional domain in the transactional middleware machine environment. Then, at step 203, the deployment center receives machine usage information from the one or more deployment agents. Finally, at step 204, the system can dynamically scaling up/down resources used in the transactional domain based on the resource usage information collected by the one or more deployment agents.

As disclosed bellow, the transactional system can be dynamically scaled up/down at two levels: machine level and package level.

Package Level Dynamic Deployment

In accordance with an embodiment of the invention, a dynamic resource broker can dynamically scale up/down a transactional system according to the resource usage changes at the package level.

Figure 3:
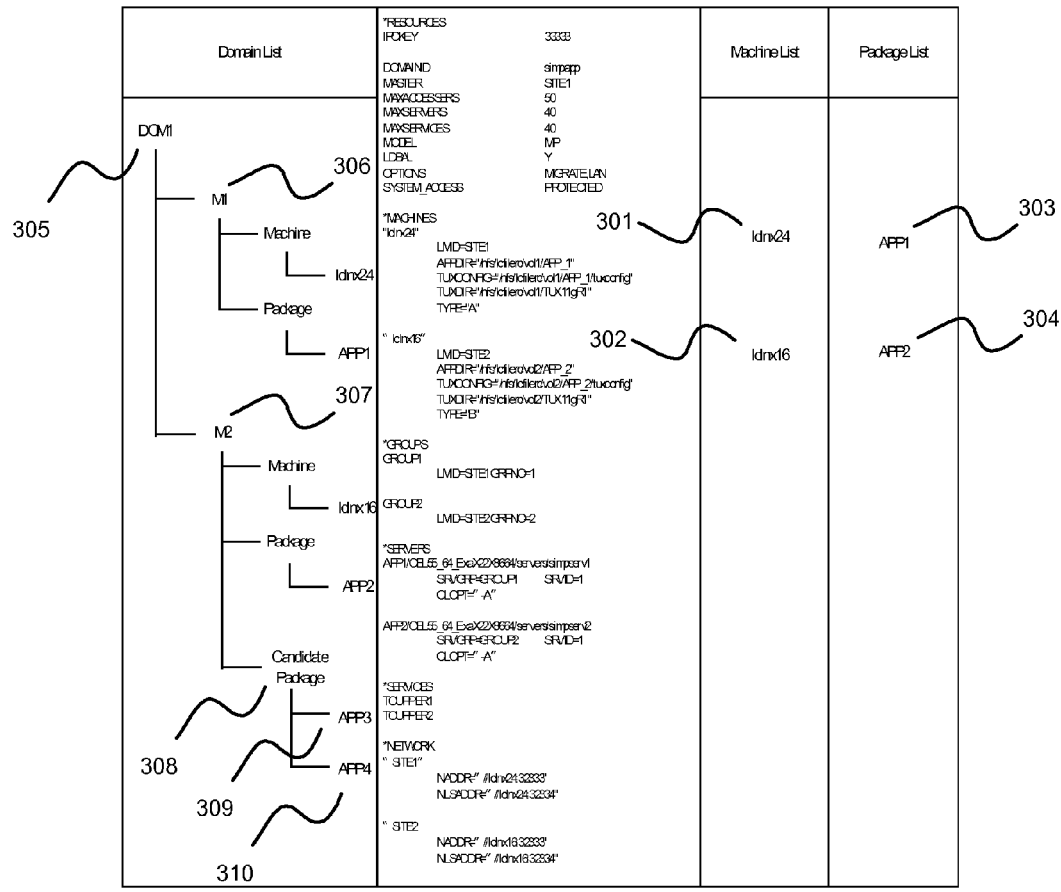
FIG. 3 shows an illustration of dynamically scaling up/down resources at the package level in a transactional middleware environment, in accordance with an embodiment of the invention.

FIG. 3 shows an illustration of dynamically scaling up/down a transactional system at a package level in a transactional middleware environment. As shown in FIG. 3, the transactional middleware environment includes two physical or logical machines, IcInx24 301 and IcInx16 302, which are responsible for running two applications: APP1 303 and APP2 304.

Additionally, the transactional middleware environment includes a domain, DOM1 305, which includes two virtual machines, M1 306 and M2 307. The virtual machine M1 306 is bound to the physical or logical machine, IcInx24 301, and is responsible for running application package APP1 303. Similarly, the virtual machine M2 307 is bound to the physical or logical machine, IcInx16 302, and is responsible for running application package APP2 304.

As shown in FIG. 3, under the virtual machine M2 307, there's a package candidate directory, Candidate Package 308, where a user can add additional packages, APP3 309 and APP4 310, to the virtual machine M2 307.

Users can add application packages for dynamic deployment to a virtual machine, e.g. M2 307, regardless of the status of the domain. For example, users can add application packages to the virtual machine M2 307, when the domain, DOM 1 305, is in an edit, deployment, booting or shutdown status. In such a case, the deployment information of the dynamically added application packages, APP3 309 and APP4 310, may not be written into the existing transactional server configuration file, such as a Tuxedo UBBCONFIG file. On the other hand, the system may only allow the package level dynamic scaling up/down of the domain, DOM 1 305, when it is in a running status.

As disclosed below, the system allows a user to perform the package level dynamic deployment both manually and automatically.

A manual way to perform the package level dynamic deployment allows a user to manually activate the application packages one by one when user determined conditions are satisfied, e.g. when the virtual machine M2 307 is underloaded. In the example of FIG. 3, a user can choose to activate APP3 309. Then, the system can select the related application package files stored in the data repository, and perform a series of application management operations, such as Tuxedo Management Information Base (MIB) operations, in order to deploy the application package, APP3 309, to the physical or logical machine, IcInx16 302, and boot the servers contained in this machine. Additionally, after the application package APP3 309 is activated, users can choose to de-activate it. Then, the system can shut down all its servers and undeploy the application package APP3 309 from the physical or logical machine, IcInx16 302.

On the other hand, an automatic way to perform the package level dynamic deployment allows the system to perform the MIB operations as described above automatically, with the user determined conditions pre-defined. Furthermore, the system can automatically undeploy the application package when necessary.

Additionally, in the example of Tuxedo, the same parameter replacement rules can be used to perform the above MIB operations in both the manual deployment and the automatic deployment. Additionally, the dynamic resource broker can reuse existing mechanisms, e.g. file formats, for deploying application packages to perform the dynamic scaling up/down of resources in a transactional domain.

Machine Level Dynamic Deployment

In accordance with an embodiment of the invention, a dynamic resource broker can dynamically scale up/down a transactional system according to the resource usage changes at the machine level.

Figure 4:
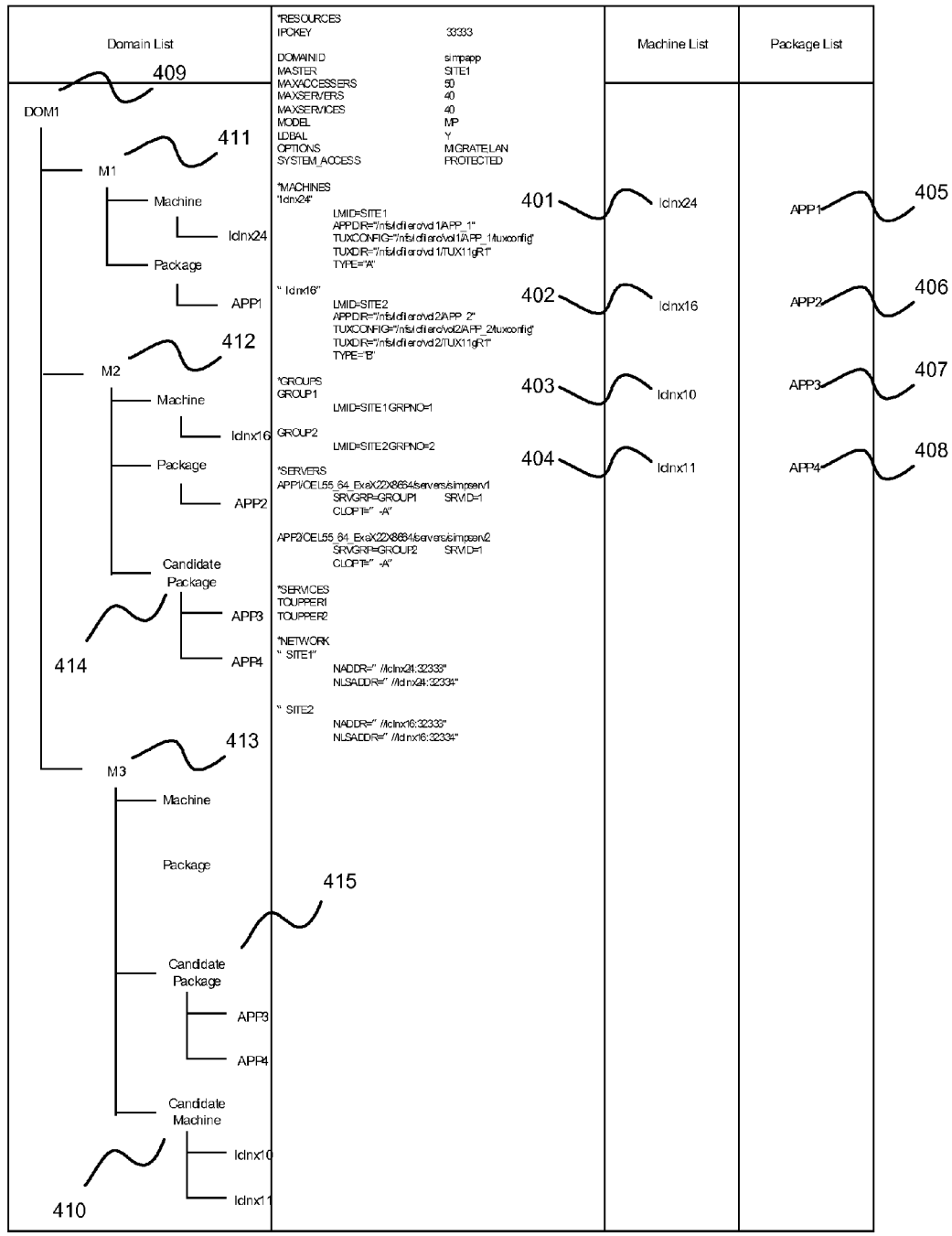
FIG. 4 shows an illustration of dynamically scaling up/down resources at the machine level in a transactional middleware environment, in accordance with an embodiment of the invention.

FIG. 4 shows an illustration of dynamically scaling up/down a transactional system at a machine level in a transactional middleware environment. As shown in FIG. 4, the transactional middleware environment includes four physical or logical machines, IcInx24 401, IcInx16 402, IcInx10 403 and IcInx11 404, which are responsible for running four applications: APP1 405, APP2 406, APP3 407, and APP4 408.

The transactional middleware environment contains a domain, DOM1 409, which includes three virtual machines, M1 411, M2 412 and M3 413. The virtual machine M1 411 is bound to the physical or logical machine, IcInx24 401, and is responsible for running application package APP1 405. Similarly, the virtual machine M2 402 is bound to the physical or logical machine, IcInx16 402, and is responsible for running application package APP2 406.

As shown in FIG. 4, the virtual machine M3 403 is not yet bound to any physical machines in the transactional middleware environment. Under the virtual machine M3 403, there's a machine candidate directory, Candidate Machine 410, which can be used by the users to add one or more logical or physical candidate machines, IcInx10 403 and IcInx11 404. The candidate machines, IcInx10 403 and IcInx11 404, can have similar architecture as the other activated machines, IcInx24 401 and IcInx16 402, so that the application packages, APP1 405, APP2 406, APP3 407, and APP4 408 can be executed on either machine, IcInx10 403 and IcInx11 404, without difficulty.

For example, the dynamic resource broker allows a candidate machine, e.g. IcInx10 403, to be bound with the virtual machine M3 403, when the virtual machine M2 412 is overloaded. Furthermore, if the candidate machine is un-bound from the virtual machine, other candidate machines, e.g. IcInx11 404, can have the opportunity to be bound with the virtual machine M3 403.

As shown in FIG. 1, a dynamically deployed candidate machine may not become the master node in a domain, since the master node, Machine A 101, in Domain A 108 maintains consistent connection with the deployment center 106. Thus, in the example as shown in FIG. 4, the candidate machines, IcInx10 403 and IcInx11 404, may not become the master node in the domain, DOM1 409.

In accordance with an embodiment of the invention, a transactional system can be dynamically scaled up/down both at the machine level and at the package level. Users can list one or more application packages, APP3 407 and APP4 408, in a package candidate directory, Candidate Package 415, so that the application packages APP3 407 and APP4 408 can be deployed to a candidate machine when the machine is dynamically deployed.

The dynamic resource broker allows a user to perform the machine level dynamic deployment both manually and automatically. The dynamic resource allocation/deallocation helps customer to manage the resources more flexible in cloud environment. When the resource usage changes, for example, when a compute node fails or arrives at the full load, the system can provide the high availability and scalability by dynamically providing additional services from other nodes. Such a switch can be automatic and without any manual intervention.

A manual way to perform the machine level dynamic deployment allows users to activate a candidate machine when one or more users determined conditions are satisfied. Then, the user can activate one or more application packages under the package candidate directory.

For example, the user can choose to activate the candidate machine IcInx10 403 and candidate application package APP3 407 when user determined conditions are satisfied, e.g. when the virtual machine M2 412 is overloaded. Then, the system can perform a series of management operations, such as Tuxedo MIB operation, to activate the candidate machine IcInx10 403 and deploy the candidate application package APP3 407 to the machine IcInx10 403, and boot the servers contained in the machine IcInx10 403. Additionally, the users can choose to undeploy the machine IcInx10 403, at which time the system can shut down this machine and deactivate all the application packages on the machine.

On the other hand, an automatic way to perform the package level dynamic deployment allows the system to perform the MIB operations described above, with the user determined conditions pre-defined. Also, the system can perform the undeployment operations automatically.

Additionally, in the example of Tuxedo, the same parameter replacement rules can be used to perform the above MIB operations in both the manual deployment and the automatic deployment. The dynamic resource broker can reuse existing mechanisms, e.g. file formats, for deploying application packages to perform the dynamic scaling up/down resources in a transactional domain.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for dynamic resource allocation in a transactional middleware machine environment, comprising:
   one or more microprocessors;
   a deployment center running on the one or more microprocessors in a transactional domain that includes a plurality of virtual machines and a plurality of physical machines;
   a plurality of deployment agents, each of which executes on one of the plurality of virtual machines, and is maintained by the deployment center;
   wherein the deployment center operates to
      receive resource usage information from the deployment agent on a first virtual machine of the plurality of virtual machines, wherein the first virtual machine is bound to a first physical machine of the plurality of physical machine for executing an application package, and
      dynamically scale up or down resources being used in the transactional domain based on the resource usage information;
      wherein the scaling up includes binding a second virtual machine of the plurality of virtual machines to a second physical machine of the plurality of physical machines, and activating the second physical machine and the application package on the second virtual machine; and
      wherein the scaling down includes unbinding the first virtual machine from the first physical machine and deactivating the first physical machine and the application package on the first virtual machine.

2. The system of claim 1, wherein the deployment center maintains one or more deployment policies for the transactional domain.

3. The system of claim 1, wherein the deployment center is configured to manage multiple transactional domains.

4. The system of claim 3, wherein the deployment center operates to dynamically scale up or down resources used in another transactional domain based on the resource usage information collected by another one or more deployment agents.

5. The system of claim 3, wherein each transactional domain includes a master virtual machine, and wherein a configuration of the master virtual machine within each transactional domain remains unchanged.

6. The system of claim 1, further comprising
   a data repository that stores a plurality of application packages uploaded by a user, before the application packages are deployed to the plurality of virtual machines.

7. The system of claim 1, wherein each of the plurality of virtual machines is associated with a machine candidate directory configured to receive a name of a physical machine for that virtual machine to be bound to, and a package candidate directory configured to receive a name of an application package for deployment to that virtual machine.

8. A method for dynamic resource allocation in a transactional middleware machine environment, comprising:

providing a deployment center running on the one or more microprocessors in a transactional domain that includes a plurality of virtual machines and a plurality of physical machines;

providing a plurality of deployment agents, each of which executes on one of the plurality of virtual machines, and is maintained by the deployment center;

receiving, via the deployment center, usage information from the deployment agent on a first virtual machine of the plurality of virtual machines, wherein the first virtual machine is bound to a first physical machine of the plurality of physical machine for executing an application package; and dynamically scale up or down resources being used in the transactional domain based on the resource usage information;

wherein the scaling up includes binding a second virtual machine of the plurality of virtual machines to a second physical machine of the plurality of physical machines, and activating the second physical machine and the application package on the second virtual machine; and wherein the scaling down includes unbinding the first virtual machine from the first physical machine and deactivating the first physical machine and the application package on the first virtual machine.

9. The method of claim 8, wherein the deployment center maintains one or more deployment policies for the transactional domain.

10. The method of claim 8, further comprising allowing the deployment center is configured to manage multiple transactional domains.

11. The method of claim 10, further comprising allowing the deployment center operates to dynamically scale up or down resources used in another transactional domain based on the resource usage information collected by another one or more deployment agents.

12. The method of claim 10, further comprising assigning a master virtual machine within each transactional domain, wherein a configuration of the master machine within each transactional domain remains unchanged.

13. The method of claim 8, further comprising
providing a data repository that stores a plurality of application packages uploaded by a user, before the application packages are deployed to the plurality of virtual machines.

14. The method of claim 8, wherein each of the plurality of virtual machines is associated with
a machine candidate directory configured to receive a name of a physical machine for that virtual machine to be bound to, and a package candidate directory configured to receive a name of an application package for deployment to that virtual machine.

15. A non-transitory computer readable storage medium, including instructions stored thereon which when read and executed by one or more computers cause the one or more computers to perform the steps comprising:

providing a deployment center running on the one or more microprocessors in a transactional domain that includes a plurality of virtual machines and a plurality of physical machines;

providing a plurality of deployment agents, each of which executes on one of the plurality of virtual machines, and is maintained by the deployment center;

receiving, via the deployment center, usage information from the deployment agent on a first virtual machine of the plurality of virtual machines, wherein the first virtual machine is bound to a first physical machine of the plurality of physical machine for executing an application package; and dynamically scale up or down resources being used in the transactional domain based on the resource usage information;

wherein the scaling up includes binding a second virtual machine of the plurality of virtual machines to a second physical machine of the plurality of physical machines, and activating the second physical machine and the application package on the second virtual machine; and wherein the scaling down includes unbinding the first virtual machine from the first physical machine and deactivating the first physical machine and the application package on the first virtual machine.

16. The non-transitory computer readable storage medium of claim 15, wherein the deployment center maintains one or more deployment policies for the transactional domain.

17. The non-transitory computer readable storage medium of claim 15, wherein the deployment center is configured to manage multiple transactional domains.

18. The non-transitory computer readable storage medium of claim 15, wherein each transactional domain includes a master virtual machine, and wherein a configuration of the master virtual machine within each transactional domain remains unchanged.

19. The non-transitory computer readable storage medium of claim 15, further comprising
providing a data repository that stores a plurality of application packages uploaded by a user, before the application packages are deployed to the plurality of virtual machines.

20. The non-transitory computer readable storage medium of claim 15, wherein each of the plurality of virtual machines is associated with
a machine candidate directory configured to receive a name of a physical machine for that virtual machine to be bound to, and a package candidate directory configured to receive a name of an application package for deployment to that virtual machine.

* * * * *